(12) United States Patent
Vile et al.

(10) Patent No.: US 8,172,496 B2
(45) Date of Patent: May 8, 2012

(54) LOCKNUT SYSTEM

(75) Inventors: David Daniel George Vile, Bicester (GB); Gerhard Dodi, Milton Keynes (GB)

(73) Assignee: Wheelsure Technologies Limited, Ampthill, Bedfordshire (GB)

( * ) Notice: Subject to any disclaimer, the term of this patent is extended or adjusted under 35 U.S.C. 154(b) by 247 days.

(21) Appl. No.: 12/307,348

(22) PCT Filed: Mar. 27, 2007

(86) PCT No.: PCT/GB2007/001114
§ 371 (c)(1),
(2), (4) Date: Mar. 6, 2009

(87) PCT Pub. No.: WO2008/003919
PCT Pub. Date: Jan. 10, 2008

(65) Prior Publication Data
US 2010/0232902 A1   Sep. 16, 2010

(30) Foreign Application Priority Data
Jul. 7, 2006   (GB) .................................. 0613588.3

(51) Int. Cl.
*F16B 39/00* (2006.01)
(52) U.S. Cl. ........................................ 411/190; 411/214
(58) Field of Classification Search .......... 411/190–192, 411/204, 214, 222, 307, 314, 931, 932, 985, 411/986
See application file for complete search history.

(56) References Cited

U.S. PATENT DOCUMENTS

| | | | |
|---|---|---|---|
| 212,382 A * | 2/1879 | Hughes ............................ 301/2 |
| 1,413,024 A * | 4/1922 | Harrell ........................ 411/243 |
| 2,391,232 A * | 12/1945 | Farrell et al. .................. 411/244 |
| 2,696,236 A * | 12/1954 | Curran .......................... 411/244 |
| 3,025,931 A * | 3/1962 | Jones ................................. 188/83 |
| 3,871,785 A * | 3/1975 | Murvall ........................ 403/259 |
| 4,342,530 A * | 8/1982 | Baker et al. .................. 411/374 |
| 5,071,300 A * | 12/1991 | McCauley ..................... 411/222 |
| 5,391,033 A * | 2/1995 | Gibbons ....................... 411/263 |
| 5,544,991 A * | 8/1996 | Richardson ................... 411/237 |

FOREIGN PATENT DOCUMENTS

| | | |
|---|---|---|
| DE | 10248472 A1 | 7/2003 |
| WO | WO02/08618 A1 | 1/2002 |
| WO | WO02/29263 A1 | 4/2002 |

* cited by examiner

*Primary Examiner* — Gary Estremsky
(74) *Attorney, Agent, or Firm* — Keusey & Associates, P.C.

(57) ABSTRACT

A locknut system having a projecting screw threaded member with a first external thread. A nut is mountable on the projecting screw threaded member by means of a corresponding thread. A second different screw thread is formed on the projecting screw threaded member. The second screw thread is of a different hand or a different pitch from the first screw thread. A locking member has a screw thread for engagement with the second screw thread of the projecting screw threaded member and has an engaging surface which can be brought into abutting contact with a corresponding engaging surface on the nut by mating the thread of the locking member with the second thread of the projecting screw threaded member. A coupling member operates to couple the locking member and the nut to substantially prevent relative rotation there between. One of the locking member and the coupling member carries a snap ring which snaps into engagement with a retaining recess provided on the other when the coupling member is mounted in its use configuration, to prevent accidental displacement of the coupling member from the locking member.

11 Claims, 3 Drawing Sheets

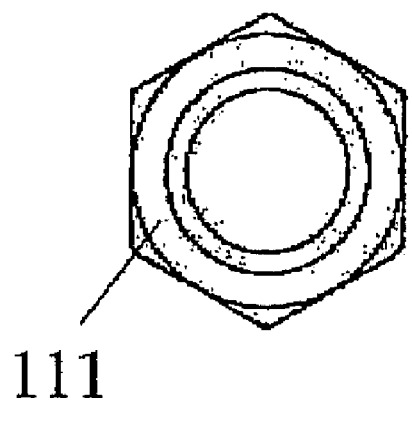
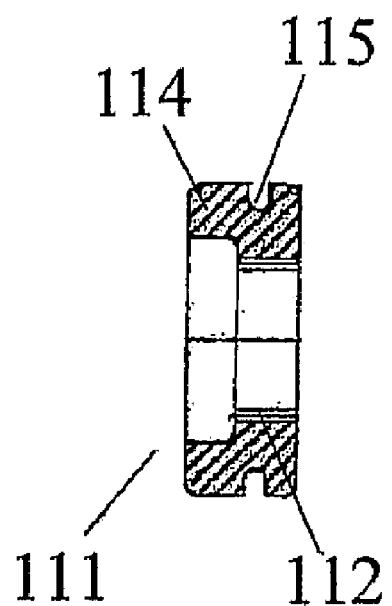
FIG 5A
FIG 5B
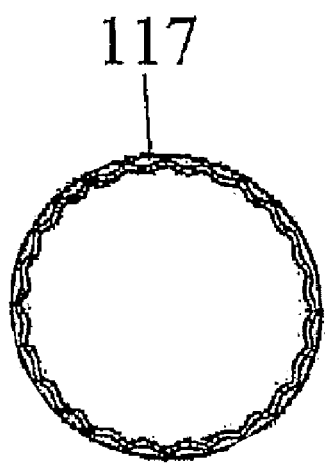
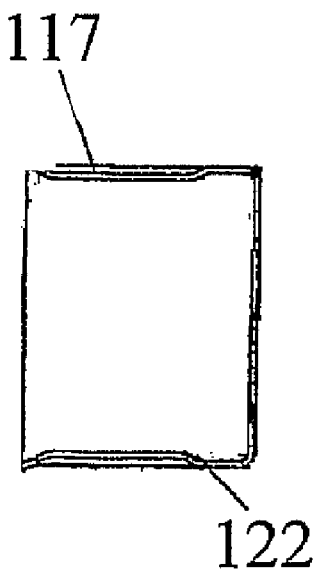
FIG 6A
FIG 6B

LOCKNUT SYSTEM

BACKGROUND OF THE INVENTION

1. Field of the Invention

This invention relates to a locknut system, that is to say a system for preventing the inadvertent release of a nut from a threaded member of which the nut is mounted.

2. The Prior Art

Nuts, screw threadedly mounted on a projecting screw threaded members (which may for example be studs, bolts or screws) are commonly used as mechanical fastenings. Such combinations (which for convenience are hereinafter referred to as "a nut and bolt") have well recognised advantages as mechanical fastenings. Equally, it is well recognised that unless special precautions are taken to prevent inadvertent slackening off of the nut, nut and bolt fastenings are liable to fail as a result of slackening off of the nut, especially where the nut and bolt are used in applications where they are dynamically loaded. A typical example of such a problem is on the wheel nuts used to retain vehicle wheels, especially on buses and trucks. The dynamic loading of the nuts and wheel studs in such applications can lead to unintended slackening of the nut with possible catastrophic results if a wheel becomes completely detached. For this reason, a number of arrangements have been proposed for preventing such unintended slackening off of the nuts which retain road wheels in position. The present invention provides in its preferred embodiment a simple system for preventing the unintended release of wheel nuts from vehicles, but it is to be understood that the invention is not limited to such applications but rather is applicable to all circumstances where the unintended release of a nut from a screw threaded member is to be avoided.

According to a first aspect of the present invention there is provided a locknut system comprising a projecting screw threaded member having a first thread, the first thread being an external thread; a nut for mounting on the projecting screw threaded member, the nut having a thread for co-operating with the first thread of the screw threaded member; a second screw thread on the projecting screw threaded member, the second screw thread being of different hand and/or being of different pitch from the first screw thread; a locking member having a screw thread for engagement with the second screw thread of the projecting screw threaded member and having an engaging surface which can be brought into abutting contact with a corresponding engaging surface on the nut by mating the thread of the locking member with the second thread of the projecting screw threaded member; and a coupling member for coupling the locking member and the nut to substantially prevent relative rotation there between, wherein one of the locking member and the coupling member carries a snap ring which snaps into engagement with a retaining recess provided on the other of the coupling and the locking member when the coupling member is mounted in its use configuration, to prevent accidental displacement of the coupling member from the locking member.

In the preferred embodiment of the present invention the second thread is of opposite hand to the first thread and is formed in a bore provided extending from the end of the projecting screw threaded member. Accordingly, the screw-threaded part of the locking member is in the form of a projection which may be screwed into the second thread. Preferably, the engaging surface of the locking member is provided as a skirt which depends from a flange connected to the screw threaded part of the locking member. Preferably, the external profile of the peripheral edge of the locking member is multi-faceted, for example hexagonal or multi-hexagonal. Preferably, the snap ring is located in a groove in the outer peripheral surface of the locking member.

Preferably, the coupling member is in the form of a cap which is formed with a profile whereby it can be mounted on the nut in a manner that prevents relative rotation between the nut and the cap. Preferably, the cap also includes a profile which can engage the locking member to prevent relative rotation between the locking member and the cap. Preferably, the same profile on the cap engages both the nut and the locking member. Preferably, the profile is a multi-hexagonal profile.

Preferably, the snap ring is of metal, for example, spring steel.

BRIEF DESCRIPTION OF THE DRAWINGS

The invention will be better understood from the following description of a preferred embodiment thereof, given by way of example only, reference being had to the accompanying drawing wherein:

FIGS. 5*a* and 5*b* are front and sectional views respectively of a locking member of the second embodiment; and FIGS. 6*a* and 6*b* are front and sectional views of a coupling member of the second embodiment.

DETAILED DESCRIPTION OF THE PREFERRED EMBODIMENTS

Figure 1A:
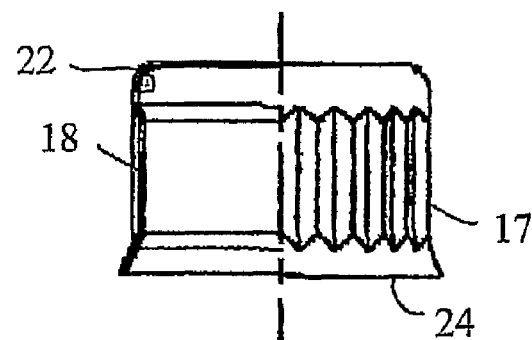
FIGS. 1A-1C are an exploded view of the components of the locking system according to a first embodiment of the present invention.
Figure 1B:
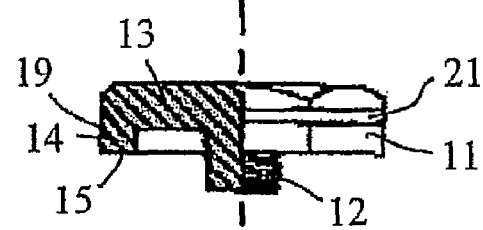
Figure 1C:
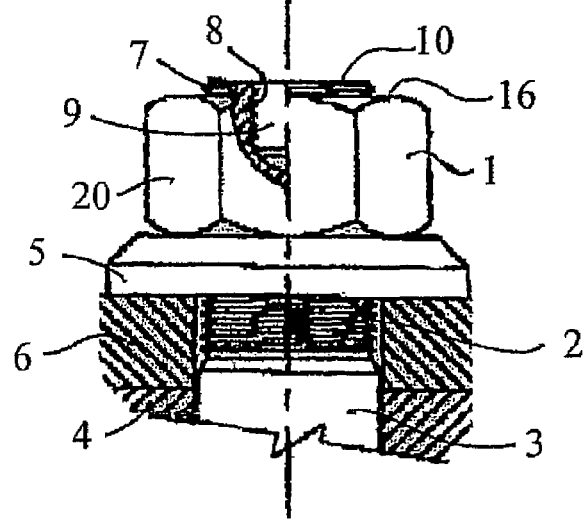
Figure 2:
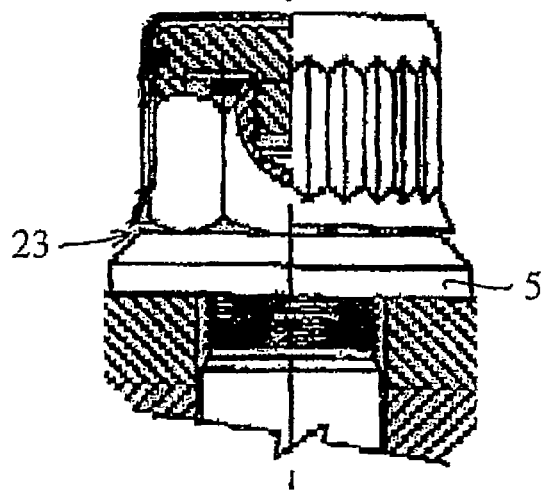
FIG. 2 is a view of the lock nut system of the first embodiment of the present invention in assembled condition, the view being partly broken away to show the interior structure thereof.

Referring first to FIGS. 1 and 2 of the drawings, there is illustrated a nut 1 mounted on a screw threaded projecting member 2. The screw threaded projecting member 2 may, for example, be a wheel stud which is secured to the hub 4 of a vehicle wheel assembly. In this case, the nut 1 and its associated washer 5 are used to retain a wheel 6 on the hub.

The projecting member 2 includes a first thread 3 which is a conventional external thread for mating with the internal thread provided on the nut 1. The stud also includes a second thread 8. The second thread 8 is an internal thread formed in the wall of a bore 9 which extend into the projecting member 2 from the free end 10 thereof.

A locking member 11 for use with the nut 1 is illustrated in FIG. 1B. The locking member 11 includes a stud 12 having a screw thread for mating with the second screw thread 8 of the projecting member 2. The stud 12 is connected to a flange 13 from which a skirt 14 depends to define an engaging surface 15 which, when the stud 12 is screwed into the thread 8, is brought into engagement with a corresponding engaging surface 16 on the end face of the nut 1.

Preferably, the second screw thread 8 of the projecting member 2 is of opposite hand to the first screw thread 7 thereof. However, this arrangement may give rise to difficulties because it may seem unnatural to a mechanic to screw the nut 1 onto the first thread 3 in one direction and then to secure the locking member by rotating it in the opposite direction.

Accordingly, the first thread 7 and the second thread 8 may be of the same hand but of different pitch. Because, in use, the locking member 11 and the nut 1 will be locked against rotation relative to each other, provided that the pitch of the first thread 7 and second thread 8 are sufficiently different the desired prevention of accidental slackening off of the nut 1 will be obtained.

Referring now to FIG. 1A, a coupling member 17 in the form of a cup is illustrated. The coupling member is formed with a multi-hexagonal profile 18 so that the interior profile of the coupling member is similar to that of a ring-spanner.

The profile 18 is adapted to form a non-rotating coupling with both the peripheral profile 19 of the locking member and peripheral profile 20 of the nut. Preferably, the peripheral profile 14 is in fact identical to the peripheral profile 20 so that the spanner used for tightening the nut 1 may also be used for tightening the locking member 11.

In use, the nut 1 is screwed onto the threaded projecting member 2 and tightened to the required torque. The locking member is then mounted on the projecting member 2 by engaging the threaded stud 12 with threads 8 of the bore 9. The locking member is tightened until the engaging surface 15 of the locking member firmly engages the corresponding abutting surface 16 of the nut 1. The cap 17 is then offered up to the pre-assembled locking member and nut and manipulated so as to be in non-rotating engagement with both the peripheral profile 19 of the locking member and the peripheral profile 20 of the nut. If this is not possible because of the particular position of the peripheral profile 19 of the locking member, the locking member may be tightened slightly further or slackened off slightly until the coupling member can be positioned. Of course, if the peripheral profiles 19, 20 are equal in size and the locking member is tightened until the peripheral profiles 19, 20 are aligned there will be no difficulty in applying the coupling member. However, strict registration of this nature is not necessary as a result of the multi-hexagonal form of the profile 18 provided on the coupling member.

In order to retain the coupling member in its use position as illustrated in FIG. 2 a snap ring 21 is provided in a groove formed around the periphery of the locking member. The snap ring 20 may be made of any suitable material, for example spring steel. The snap ring will be formed with a gap so that it can be compressed somewhat as the multi-hexagonal profile 18 passes over the snap ring. As soon as the snap ring clears the profile 18 it will snap back out into a recess 22 provided for the purpose adjacent closed end of the coupling member 17. The complete assembly, with the components in this relative position, is shown in FIG. 2. It will be noted that accidental displacement of the coupling member is extremely unlikely because of the spring force of the snap ring 21. However, if desired the coupling member can readily be removed by inserting a suitable tool, for example a screwdriver, into the gap 23 which exists between the base 24 of the coupling member and the washer 5 and levering the coupling member off. It is also to be noted that if the locking member is not fitted there is nothing to retain the coupling member in position and accordingly a light pull on the coupling member by hand will immediately identify whether or not the locking member is present.

Figure 3:
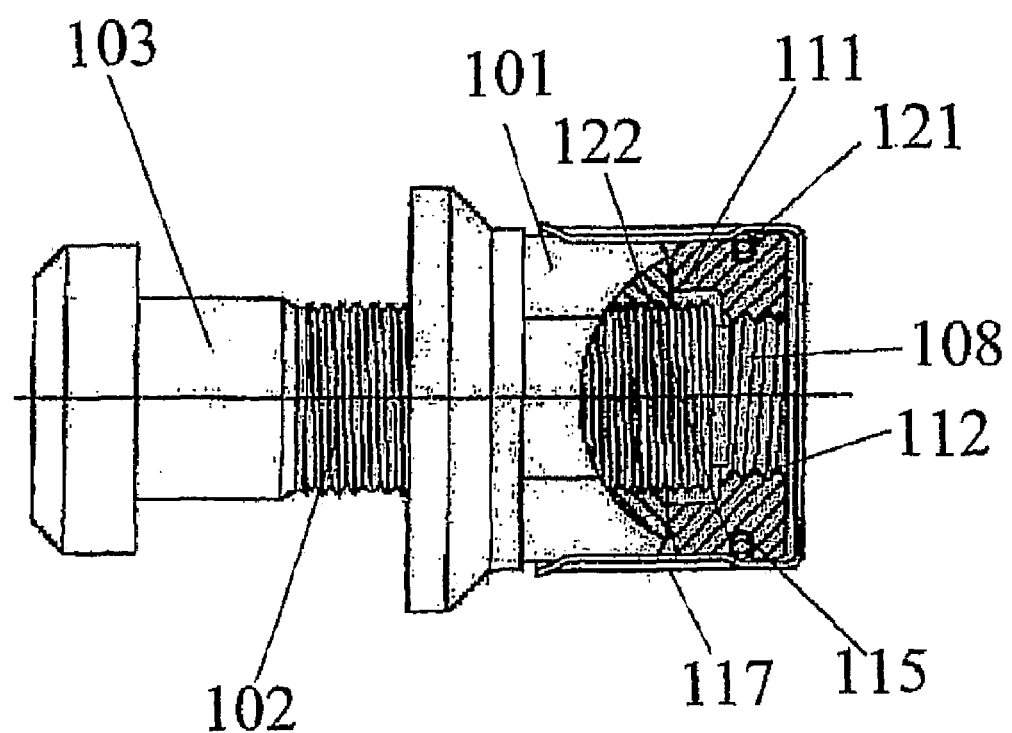
FIG. 3 is a partially cut away side view of the assembled locking system according to a second embodiment of the invention.
Figure 4:
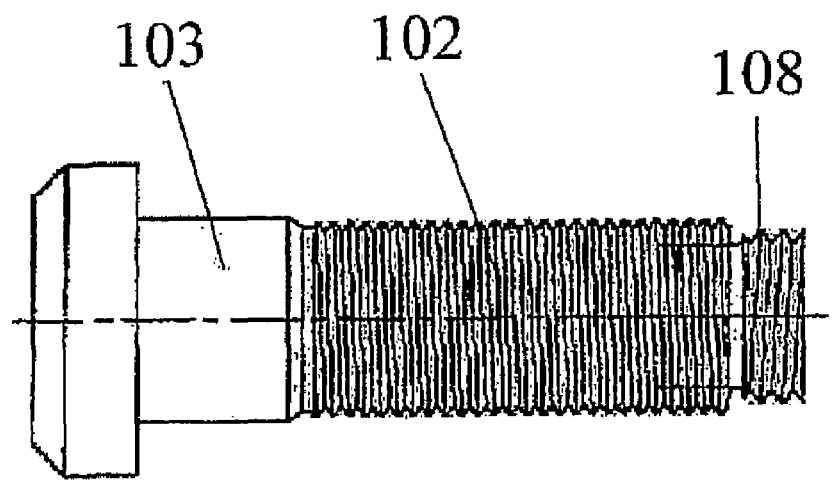
FIG. 4 is a side view of the projecting member which forms part of the system of FIG. 3.

Referring next to FIGS. 3 to 6, there is shown a second embodiment of the present invention. FIG. 3 shows a partially section view of the assembled locknut system on which a nut 101 is mounted on a first external threaded section 103 of a projecting member 102, which may be a wheel stud which is secured to the hub of a vehicle wheel assembly. The projecting member 102, shown in more detail in FIG. 4, also includes a second threaded section 108, but in contrast with the first embodiment, the second threaded section 108 is an external thread which is formed on the outer surface of a portion of the projecting member which extends beyond the first threaded section 103. Preferably, the second threaded section 108 is of opposite hand to the first threaded section 103, but may alternatively, as with the first embodiment, may be of different pitch to the first threaded section. The second threaded section 108 is also preferably of smaller diameter than the first threaded section so as to facilitate engagement of the nut 101 on the first threaded section 103.

A locking member 111 for use with the second embodiment is illustrated in FIGS. 5a and 5b and is in the form of a nut having an internal thread 112 which complements the external threaded of the section threaded section. An annual skirt 114 depends from the outer edge of the nut, the internal diameter of said skirt 114 being a clearance fit over the external thread of the first threaded section 103 so that, when the locking member 111 is screwed onto the second threaded section, the annular end face of the skirt is brought into abutment with the facing surface of the nut 101. The locking member 111 also included an annular groove 115 in its outer surface in which is engageable a snap ring 121.

As with the first embodiment, the nut 101 is screwed onto the first thread 103 in order to retain an element such as a wheel on the projecting member 102. The locking member 111 is then screwed onto the second threaded member until the skirt 114 thereof comes into engagement with the facing surface of the nut 101. A coupling member 117 in the form of a cap whose form and operation are substantially identical to the first described embodiment, is then offered up to the pre-assembled locking member 111 and nut 101 and manipulated so as to engage non-rotatably with the outer profile of both the nut 101 and the locking member 111. Fine adjustment of the rotational position of the locking member 111 may be necessary as described above in connection with the first embodiment in order to achieve the required locking connection between the coupling member 117 and both the nut 101 and locking member 111. Preferably, the outer profiles of the nut 101 and the locking member 111 are identical as this simplifies the design of the coupling member 117 and also makes correct alignment easier. However, the outer profile of the locking member 111 could differ, for example be small than that of the nut 101 as long as the internal profile of the coupling member is suitable shaped. The snap ring 121 of the locking member 111 co-operates with a recess 122 formed on the internal profile of the coupling member 117 in order to retain the coupling member 117 in place as described in connection with the first embodiment.

It will be understood, as previously stated, that although the above embodiment is described in relation to the use of the invention in relation to retaining wheels on vehicles, the subject invention has much wider applications and simply for wheel fastenings—for example rail track fastenings and wind turbines to name but two.

The invention claimed is:

1. A locknut system comprising:
    a projecting screw threaded member having a first external thread and an end;
    a nut for mounting on the projecting screw threaded member, the nut having a thread for co-operating with the first thread of the screw threaded member and a first engaging surface;
    a second screw thread formed in a bore which extends from the end of the projecting screw threaded member, the second screw thread being different than the first screw thread;

a locking member having a screw thread in the form of a projection which may be screwed into the second screw thread of the projecting screw threaded member and having a second engaging surface which can be brought into abutting contact with the first engaging surface on the nut by mating the screw thread of the locking member with the second screw thread of the projecting screw threaded member, wherein the external profile of the second engaging surface is selected from the group consisting of a multi-faceted external profile, a hexagonal external profile and a multi-hexagonal external profile; and a coupling member for coupling the abutting engaging surfaces of the locking member and the nut to substantially prevent relative rotation there between, wherein one of the locking member and the coupling member carries a snap ring which snaps into engagement with a retaining recess provided on the other of the coupling member and the locking member when the coupling member is mounted in its use configuration, to prevent accidental displacement of the coupling member from the locking member.

2. The locknut system according to claim 1, wherein the second thread is of opposite hand to the first thread.

3. The locknut system according to claim 1, wherein the second thread is of a different pitch than the first thread.

4. The locknut system according to claim 1, wherein the locking member is provided with a skirt which extends from its engaging surface.

5. The locknut system according to claim 1, wherein the snap ring is located in a groove in the outer peripheral surface of the locking member.

6. The locknut system according to claim 1, wherein the coupling member is in the form of a cap which is formed with a profile whereby it can be mounted on the nut in a manner that prevents relative rotation between the nut and the cap.

7. The locknut system according to claim 6, wherein the profile is a multi-hexagonal profile.

8. The locknut system according to claim 6, wherein the cap also includes a profile which can engage the locking member to prevent relative rotation between the locking member and the cap.

9. The locknut system according to claim 7, wherein the same profile on the cap engages both the nut and the locking member.

10. The locknut system according to claim 1, wherein the snap ring is made of metal.

11. The locknut system according to claim 1, wherein the snap ring is made of spring steel.

\* \* \* \* \*

UNITED STATES PATENT AND TRADEMARK OFFICE
CERTIFICATE OF CORRECTION

PATENT NO. : 8,172,496 B2
APPLICATION NO. : 12/307348
DATED : May 8, 2012
INVENTOR(S) : David Daniel George Vile and Gerhard Dodl It is certified that error appears in the above-identified patent and that said Letters Patent is hereby corrected as shown below:

On the Title page, item (75), line 2, delete "Dodi" and insert --Dodl--.

Signed and Sealed this
Twenty-third Day of October, 2012

David J. Kappos
*Director of the United States Patent and Trademark Office*